Figure 1:
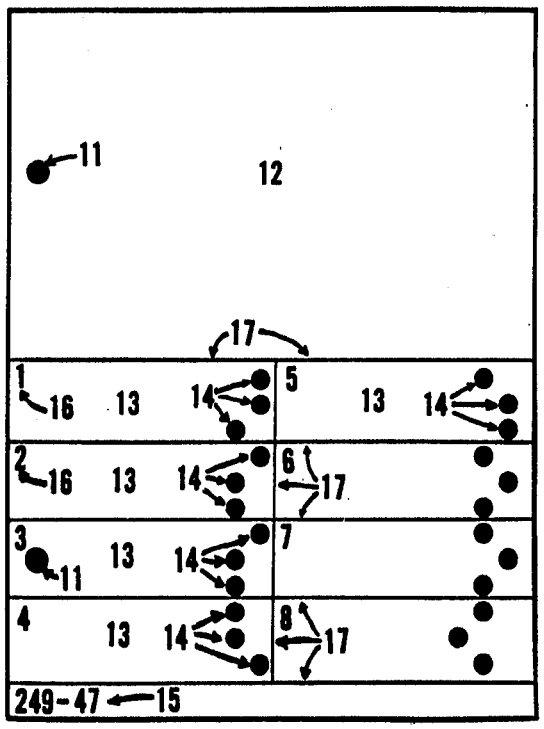

United States Patent [19]

Harte

[11] 4,449,943

[45] May 22, 1984

[54] TEACHER PREPARED FORMATS FOR INSTRUCTIONAL APPARATUS

[76] Inventor: James R. Harte, 10 W. Concord, Kansas City, Mo. 64112

[21] Appl. No.: 384,234

[22] Filed: Aug. 2, 1982

[51] Int. Cl.³ .............................................. G09B 3/08
[52] U.S. Cl. ..................................... 434/334; 434/354
[58] Field of Search ............... 434/334, 335, 338, 340, 434/341, 353, 354, 360, 361, 363, 364

[56] References Cited

U.S. PATENT DOCUMENTS

| | | | |
|---|---|---|---|
| 3,747,229 | 7/1973 | Harte | 434/334 |
| 3,754,337 | 8/1973 | Harte | 434/334 |
| 3,902,255 | 9/1975 | Harte | 434/334 |
| 3,964,176 | 6/1976 | Harte | 434/334 |
| 3,973,331 | 8/1976 | Harte | 434/334 |
| 4,065,858 | 1/1978 | Harte | 434/363 X |
| 4,074,445 | 2/1978 | Friedman | 434/354 |

*Primary Examiner*—William H. Grieb
*Attorney, Agent, or Firm*—D. A. N. Chase; Michael Yakimo, Jr.

[57] ABSTRACT

Instructional apparatus of two parts to be used in conjunction with previously patented instructional apparatus, U.S. Pat. Nos. 3,902,255, 3,964,176, and 4,065,858, which have a grid of depressions of two or more different depths. The first part of this invention is a sheet of material that contains a series of pre-punched holes that correspond to some of the shallow and deep depressions when this sheet of material is precisely positioned on the upper surface of the grid of underlying depressions. The first part of this invention provides a "blank" sheet that has a minimum of printing on its upper surface, this "blank" sheet has a pattern of pre-punched holes that correspond to correct or incorrect responses. The second part of this invention is a printed sheet that has printed large dots or other indicating means, that when accurately alligned and positioned under the first part reveal which of the holes in the first part correspond to correct responses, and which holes correspond to incorrect responses. This allows an instructor to rapidly and conveniently prepare their own instructional formats that provide the student with immediate feedback in the manner described in the above noted patents. The instructor may type, print, draw, or use other graphic means to illustrate the question, and give a choice of answers.

2 Claims, 8 Drawing Figures

Fig.7

Fig.8

TEACHER PREPARED FORMATS FOR INSTRUCTIONAL APPARATUS

CROSS REFERENCES

Harte U.S. Pat. Nos. 3,747,229, 3,754,337, 3,902,255, 3,964,176, 3,973,331, 4,065,858.

This invention relates to improvements in instructional apparatus of the types cited in the above patents. More specifically it relates to a mechanism and a process by which a teacher can easily, rapidly, and economically prepare their own instructional formats in any area they choose that give the student immediate feedback as to correct or incorrect responses. These instructor prepared formats can then be reused many times by the same student, or by different students.

My prior work in educational self-instructional and self-testing apparatus having immediate response feedback includes the development of a holding mechansim with depressions on its upper surface of two or more different depths. These depressions of different depths are then covered by two different sheets. The top sheet has questions, a choice of answers, and illustrations printed on its upper surface, and also has a pattern of holes pre-punched through it that correspond to correct and incorrect answer choices. These pre-punched holes are so positioned that when this sheet is precisely positioned within the holding frame that contains a grid of shallow and deep depressions, that the pre-punched holes have the same center as the underlying shallow and deep depressions. A sheet of unprinted paper is then sandwiched between the printed and pre-punched sheet, and the holding frame that contains the grid of shallow and deep depressions. This unprinted sheet then obscures the depth of the underlying depressions from the student. The student then selects what he or she feels is is the correct response or correct choice, and pushes a stylus with a cone shaped tip through the punched out area that represents the choice they feel is correct. In the preferred construction of this apparatus, all correct responses will correspond with punched out holes in the printed format that lie immediately over deep depressions, and all incorrect responses will correspond with punched out holes in the printed format that lie immediately over shallow depressions. When the student pushes the stylus with a cone shaped tip through the hole they feel is correct, the stylus will penetrate the unprinted sheet and if it goes into a shallow depression in the grid, it will produce only a small hole in the unprinted sheet, indicating that an incorrect choice has been made. If the stylus is pushed through a punched out hole in the printed format that is correct, it will enter a deep depression in the grid of depressions, and will produce a large hole in the unprinted sheet. In addition to the size of hole that is produced in the unprinted sheet giving visual feedback to the student and instructor, the student also gets proprioceptive feedback due to the difference in "feel" when the stylus is pushed into a shallow depression and a deep depression.

The essential features of the present invention are to provide the instructor with incomplete instructional formats, and a means to allow the instructor to accurately, rapidly, and economically prepare instructional formats in any subject area they choose, and that these formats when used in conjunction with the unprinted sheets, and the instructional apparatus with a grid of shallow and deep depressions will give the student immediate feedback as to the correctness or incorrectness of their responses in the manner described above. The essential features of this invention is comprised of two parts. The first part is a pre-punched format with a minimum of printing on its upper surface, this printing serving primarily as a guide to the instructor for the proper placement of instructions, questions, and answers. The second part of this invention is a sheet that has printed on its upper surface a pattern of large printed dots that correspond to all of the deep depressions in the grid of depressions in the holding frame. This pattern of large printed dots or other indicating means has the same distance from center to center as do the deep depressions in the grid of depressions. This space arrangement will then reveal to the instructor which of the pre-punched holes correspond to correct responses, and which of the pre-punched holes in the format correspond to incorrect responses when the pre-punched format is properly positioned on top of the sheet containing the pattern of large printed dots. The large printed dots will appear only through the pre-punched holes that correspond to correct answers. With this combination, an instructor can rapidly place the correct answer in the area nearest the black dot, and place incorrect answers in the other answer areas for that particular question. The instructor may use typing, writing, drawing, or cut and pasted material to illustrate the material he or she desire to teach, and to prepare appropriate and relevant questions. These teacher or instructor prepared formats can then be used in a manner identical to the printed and pre-punched formats described in the previously noted cross referenced patents.

Figure 2:
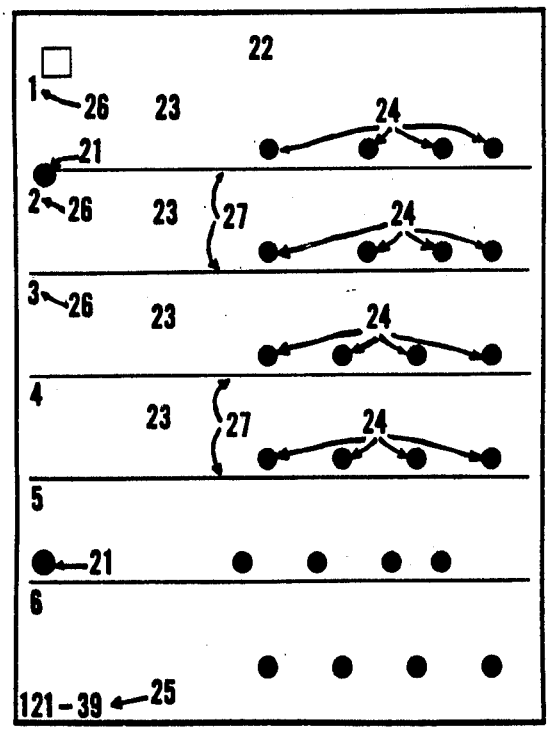
Figure 3:
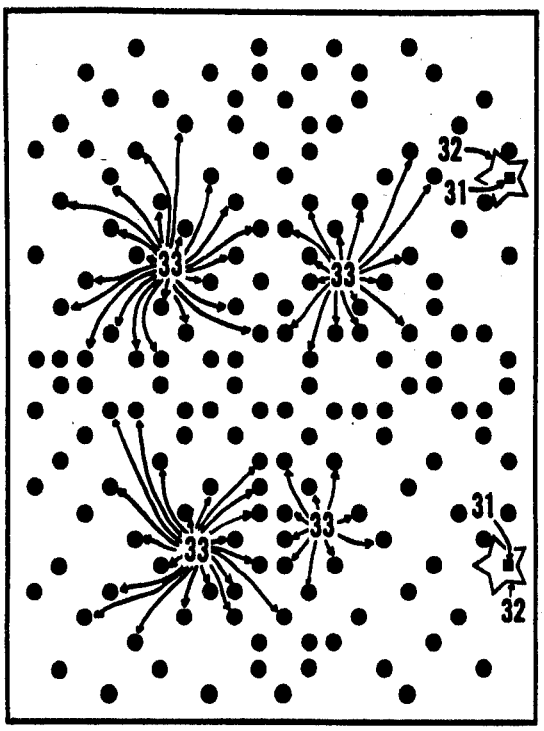

FIGS. 1 and 2 illustrate the first part of this invention. FIG. 3 illustrates the second part of this invention. FIGS. 4, 5, 6, 7, and 8 are used to illustrate how this invention work when it is used with a teaching apparatus that gives the student immediate feedback as to the correctness or incorrectness of their responses by the use of shallow and deep depressions in a holding frame, when this frame is used with overlying printed and pre-punched formats, and with a blank sheet sandwiched between the frame and the printed and pre-punched formats. The invention shown in FIGS. 1, 2, and 3 enables an instructor to rapidly and economically prepare their own reuseable instructional formats that give students immediate feedback as to the correctness or incorrectness of their responses when these formats are properly used with the type of teaching machine shown in FIGS. 5 and 6.

FIG. 1 is an illustration of a sheet of paper, plastic, or similar material that has printed on its upper surface guide lines 17, and a series of numbers 16, that correspond to question and answer areas 13. FIG. 1 also shows two types of round holes, 11 and 14 that have been precisely punched through the sheet of material. One type of through holes 11, are located along one edge of the sheet, and are for proper positioning of the sheet on a holding frame of the type shown in FIG. 5. The other type of through holes 14, correspond to correct or incorrect response areas. A sheet code number 15, is shown at the bottom of the sheet. A large area 12 at the top of the sheet is to give the instructor a place to put instructions or illustrative material.

FIG. 2 is an illustration of a sheet of paper, plastic, or similar material that has printed on its upper surface guide lines 27, and a series of numbers 26, that correspond to question and answer areas 23. FIG. 2 also shows two through holes 21, along one edge of the sheet that allow for proper positioning of the sheet on a holding frame of the type shown in FIG. 5. FIG. two shows a second type of through holes 24, that correspond to correct or incorrect answer areas. A sheet code number 25, is shown at the bottom of the sheet. At the top of the sheet is area 22 that allows for a title and brief instructions to the student.

FIG. 3 is a sheet of material on which is printed a master pattern of large dots 33, two small squares 31, and two five point stars 32. The five point stars 32, surround and help in the location of small squares 31. Instructions to the user, 34, telling how to use this sheet, are printed at the bottom. The two small squares 31, printed along one edge of the sheet are to facilitate the proper positioning of this sheet under the type of sheets shown in FIGS. 1 and 2. The two small squares 31, also precisely correspond to the location of positioning pins 56, shown in FIG. 5, and the positioning holes 11, in FIG. 1, and 21 in FIG. 2. Master pattern of large dark dots 33, in FIG. 3, corresponds to the deep depressions 65, shown in FIG. 5, and has the same dimensions from center to center as do deep depressions 65 in FIG. 5.

Figure 4:
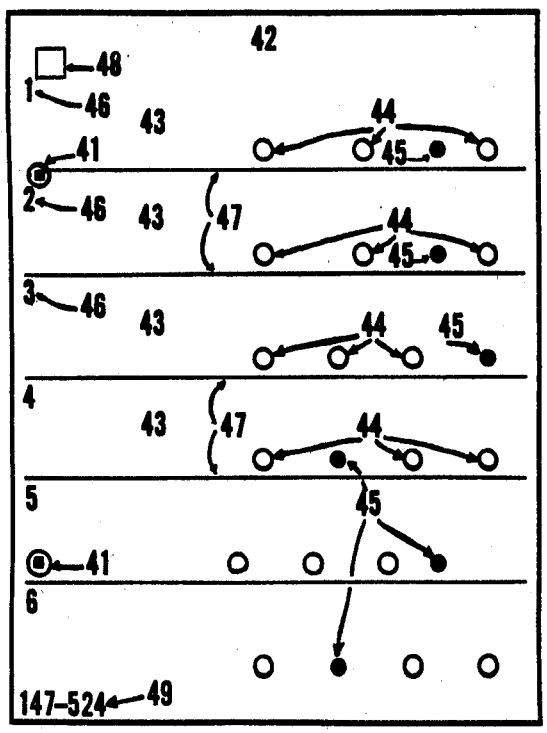

FIG. 4 shows the sheet of material illustrated in FIG. 2 after it has been correctly positioned on top of the sheet of material in FIG. 3, and shows the two small positioning squares 31 in FIG. 3, showing through the positioning holes 41, of FIG. 4. Postioning holes 41, of FIG. 4, are the same as positioning holes 21 of FIG. 2. The master pattern of large dark dots 33 in FIG. 3, show only through holes 45 in FIG. 4. These dark dots indicate to the instructor the areas where correct responses are to be placed. Through holes 44, show only white areas from the underlying sheet shown in FIG. 3, and these white circular areas indicate to the instructor that only incorrect responses are to be located adjacent to these punched out areas. In FIG. 4, 42 is an area for the title and brief instructions; 48 is an area where the sheet number can be located; 46 indicates the number of the question and answer area; and 49 is a sheet code number.

Figure 5:
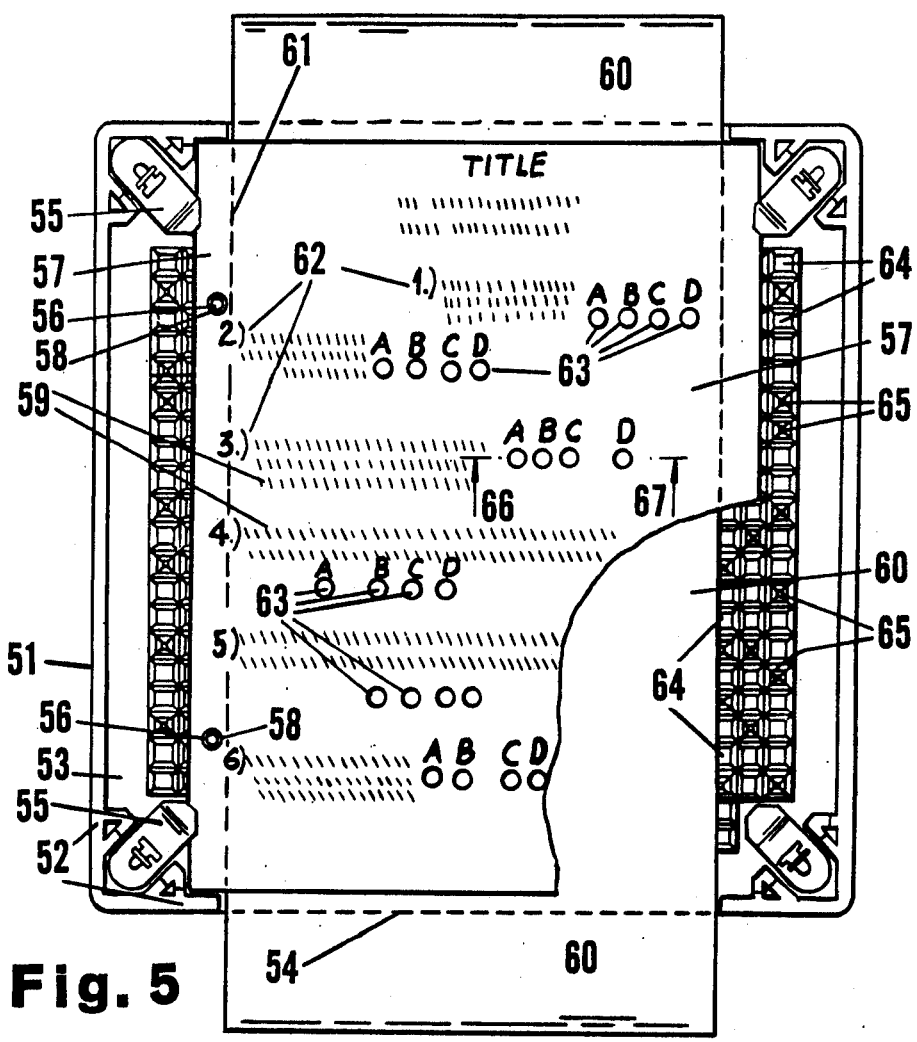

FIG. 5 shows a holding frame of injected molded plastic or similar material. Holding frame 51, has corners 52, an upper surface 53, a lower edge 54, and holding clips 55 in each corner. Positioning pins 56 protrude up from surface 53 of holding frame 51. Pre-punched sheet of paper 57 contains positioning holes 58, and a series of questions 62 printed on its surface. Questions 62 are numbered one through six and contain printed or written questions and directions 59. For each question 62, there are four possible correct answer selections, A, B, C, and D. A, B, C, and D are located above through holes 63. The centers of through holes 63 correspond to the centers of some of the shallow depressions 64, and some of the deep depressions 65 in holding frame 51. Blank sheet of paper 60, is sandwiched between printed and punched sheet 57 and the upper surface 53 of holding frame 51. A broken line 61, shows one edge of sheet 60.

Figure 6:
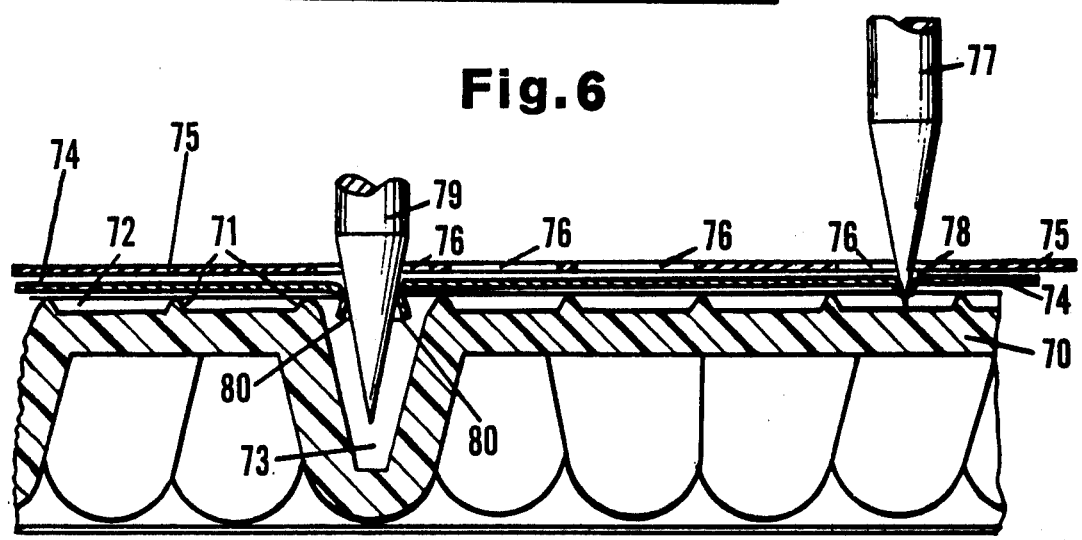

FIG. 6 shows a cutaway cross-section view through line 66–67 of FIG. 5, and shows holding frame 70, with a grid of ridges 71, that define the outer edges of shallow depressions 72, and deep depressions 73. FIG. 6 shows a cross section through blank sheet of paper 74, and a cross section through printed and punched sheet 75. Blank sheet 74 is sandwiched between sheet 75, and the grid of ridges 71 of holding frame 70. Stylus 77 also pierces blank sheet 74, producing small hole 78 in sheet 74. FIG. 6 also shows a cone tipped stylus 79 passing through a hole 76 in sheet 75, and producing a large hole 80 in sheet 74 as the tip of stylus 79 enters deep depression 73. The small hole 78 produced in sheet 74 indicates that this was an incorrect answer. The large hole 80 produced in sheet 74 indicates this was a correct answer.

Figures 7, 8:
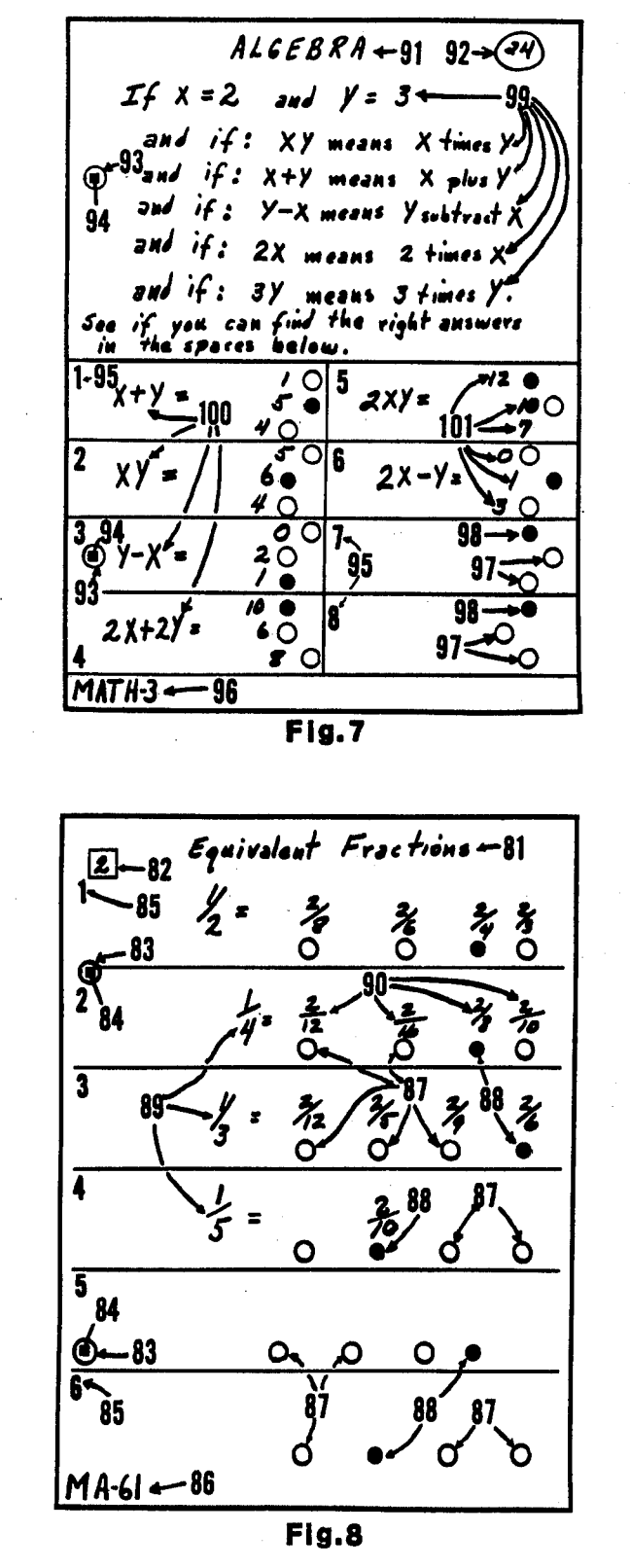

FIG. 7 is an illustration of a partly completed, instructor prepared teaching sheet where the subject is Algebra. FIG. 7 corresponds to the sheet illustrated in FIG. 1, that has been properly positioned on top of the sheet illustrated in FIG. 3, and partly completed by the instructor with a felt tipped pin to provide a format that will give the student immediate feedback in the subject of Algebra. This instructor prepared sheet is almost ready for use on the holding frame that is illustrated in FIGS. 5 and 6. In FIG. 7, the instructor has filled in the title: Algebra 91, and the page number 92. The sheet has been positioned prior to being filled out, so that small square 94, in the underlying master pattern of dark dots, and two small squares 94, can be seen through positioning hole93. Instructions and illustrations 99 have been written on the upper part of the sheet by the instructor. Problems or questions 100, and answer choices 101, have been written by the instructor in the first six question and answer areas in number sequence 95. Correct answer areas 98, have a large dark dot appearing through this punched out hole, and incorrect answer areas 97, have only white appearing through the punched out holes where incorrect answers are to be placed in close proximity.

FIG. 8 is an illustration of a partly completed, instructor prepared teaching sheet where the subject is Equivalent Fractions. In FIG. 8, the sheet shown in FIG. 2 has been properly positioned on top of the sheet shown in FIG. 3, to produce the pattern of identifiable correct and incorrect response areas that are illustrated in FIG. 4. The instructor has partly completed this sheet to obtain a format that will give the student immediate feedback as to the correctness or incorrectness of his or her responses in picking which are equivalent fractions, when the student uses this format in the manner described and illustrated in FIGS. 5 and 6. In FIG. 8, 81 is the title written in by an instructor with a felt tipped pen; 82 is the page or sheet number; 83 is a positioning hole or holes; 84 is the positioning small square or squares on the underlying sheet, that indicates correct positioning of the sheet shown in FIG. 2 on top of the sheet shown in FIG. 3; and 85 is a sequence of six numbers that indicate six question and answer areas. A code number 86, has been added by the instructor. White appearing through punched out holes 87, indicate that incorrect answers are to be placed in the areas above these holes. Black dots appearing through punched out areas 88, indicate that correct answers are to be placed in the areas above these black dots. When the top sheet as is illustrated in FIG. 8 has been completed by the instructor, it can be used by the student in the manner illustrated in FIGS. 5 and 6.

I Claim:

1. What is claimed is: an invention comprised of two parts, the first part being a sheet of paper, plastic, or similar material, through which holes have been punched in a precise manner so that these holes correspond to shallow and / or deep depressions contained in a holding frame used in conjunction with this invention; and a second part of this invention being a sheet of paper, plastic, or similar material, that has printed on its surface a precise pattern of dots or other indicating means, that when used in conjunction with the first part of this invention by placing the second sheet under the first sheet in such a manner that it will indicate to an instructor which of the through holes in the first part will be above shallow depressions, and which of the holes in the sheet will be above deep depressions that are contained in a holding frame that is used with this invention: this arrangement allows an instructor to rapidly and economically prepare instructional formats in any area the instructor chooses; said formats providing the student with immediate feedback as to the correctness or incorrectness of his or her answer choices, when said formats are used in conjunction with the instructional apparatus in previously noted patents.

2. The invention as claimed in claim 1, and where one part of the invention has additional printing to indicate to the instructor that proper allignment, and proper positioning of the first part over the second part has been atained.

* * * * *

UNITED STATES PATENT AND TRADEMARK OFFICE
CERTIFICATE OF CORRECTION

PATENT NO. : 4,449,943
DATED : May 22, 1984
INVENTOR(S) : JAMES R. HARTE

It is certified that error appears in the above—identified patent and that said Letters Patent is hereby corrected as shown below:

On the title page;

In the Abstract of the Disclosure, line 15 of the second column, delete "alligned" and substitute --aligned--.

Column 2, line 27, delete "desire" and substitute --desires--

Column 2, line 31, delete "cross" and substitute --prior--; same line, delete "referenced".

Column 4, line 13, delete "pin" and substitute --pen--.

Claim 1, Column 4, line 61, delete "What is claimed is:"; same line, delete "an" and substitute --An--; same line, delete "comprised of" and substitute --comprising--.

Claim 1, Column 4, line 67, delete "a" first occurrence, and substitute --the-- therein; same line, delete "of this invention".

Claim 1, Column 5, line 2, insert --and-- before the word "that".

UNITED STATES PATENT AND TRADEMARK OFFICE
CERTIFICATE OF CORRECTION

PATENT NO. : 4,449,943
DATED : May 22, 1984
INVENTOR(S) : JAMES R. HARTE

It is certified that error appears in the above—identified patent and that said Letters Patent is hereby corrected as shown below:

Claim 1, Column 5, line 3, delete "by placing"; same line, insert --is placed-- before "under".

Claim 1, Column 5, line 6, insert --said-- before "shallow".

Claim 1, Column 5, line 7, delete "in the sheet" and substitute --therein--; same line, insert --said-- before "deep".

Claim 1, Column 5, line 8, delete "a" and substitute --the--.

Claim 1, Column 5, line 9, delete the semicolon after "invention" and substitute --, whereby-- therein.

Claim 1, Column 5, line 11, delete the semicolon after "chooses" and substitute a comma therein.

Claim 1, Column 6, line 2, delete ", when" and substitute a period therein.

UNITED STATES PATENT AND TRADEMARK OFFICE
CERTIFICATE OF CORRECTION

PATENT NO. : 4,449,943
DATED : May 22, 1984
INVENTOR(S) : JAMES R. HARTE

It is certified that error appears in the above—identified patent and that said Letters Patent is hereby corrected as shown below:

Claim 1, Column 6, delete lines 3 and 4 in their entireties.

Claim 2, Column 6, line 5, delete "and where" and substitute --wherein said--.

Claim 2, Column 6, line 6, delete "additional"; same line, insert --thereon-- after "printing".

Claim 2, Column 6, line 7, delete "allignment" and substitute --alignment--.

Claim 2, Column 6, line 8, delete "atained" and substitute --attained--.

Signed and Sealed this

Twenty-fifth Day of June 1985

[SEAL]

Attest:

DONALD J. QUIGG

Attesting Officer

Acting Commissioner of Patents and Trademarks